(12) United States Patent
Kahn et al.

(10) Patent No.: US 9,976,864 B2
(45) Date of Patent: May 22, 2018

(54) PREDICTED TRAVEL INTENT

(71) Applicant: Microsoft Technology Licensing, LLC, Redmond, WA (US)

(72) Inventors: Zachary Adam Kahn, Bellevue, WA (US); Karan Singh Rekhi, Bellevue, WA (US); Gautam Kedia, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/482,185

(22) Filed: Apr. 7, 2017

(65) Prior Publication Data

US 2017/0211945 A1    Jul. 27, 2017

Related U.S. Application Data

(63) Continuation of application No. 14/105,095, filed on Dec. 12, 2013, now Pat. No. 9,618,343.

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3617* (2013.01); *G06F 17/3087* (2013.01);
(Continued)

(58) Field of Classification Search
None
See application file for complete search history.

(56) References Cited

U.S. PATENT DOCUMENTS

| 7,010,570 B1 | 3/2006 | Boles et al. |
| 7,103,642 B1 | 9/2006 | Chen et al. |

(Continued)

FOREIGN PATENT DOCUMENTS

| CA | 2708197 | 12/2011 |
| WO | WO 2009146087 | 12/2009 |

OTHER PUBLICATIONS

Jan. 2012, Available at: http://www.locationaware.usf.edu/ongoing-research/projects/dynamic-travel-information-personalized-and-delivered-to-your-cell-phone/, 2 pages.
(Continued)

*Primary Examiner* — Todd Melton (57) ABSTRACT

One or more techniques and/or systems are provided for providing a recommendation and/or a travel interface based upon a predicted travel intent. For example, a set of user signals (e.g., search queries, calendar information, social network data, etc.) may be evaluated to determine the predicted travel intent for a user to travel to a destination. A recommendation may be provided based upon the predicted travel intent. For example, images, news stories, advertisements, events, attractions, travel accommodation (e.g., hotel, car, and/or flight reservation functionality) and/or other information and functionality associated with the destination may be provided through the recommendation. The recommendation may be provided through an alert, a mobile app, a website, a travel interface, and/or a variety of other interfaces. The predicted travel intent may be used to modify information provided by a website, an operating system, and/or apps (e.g., a news app may display information about the destination).

20 Claims, 9 Drawing Sheets

(51) Int. Cl.
*G06F 17/30* (2006.01)
*G06N 5/04* (2006.01)
*G06N 99/00* (2010.01)

(52) U.S. Cl.
CPC .. *G06F 17/30241* (2013.01); *G06F 17/30867* (2013.01); *G06F 17/30876* (2013.01); *G06N 5/04* (2013.01); *G06N 99/005* (2013.01)

(56) References Cited

U.S. PATENT DOCUMENTS

| | | |
|---|---|---|
| 7,162,473 B2 | 1/2007 | Dumais |
| 7,167,903 B2 | 1/2007 | Percival |
| 7,342,587 B2 | 3/2008 | Danzig et al. |
| 7,487,918 B2 | 2/2009 | Kudo et al. |
| 7,539,656 B2 | 5/2009 | Fratkina et al. |
| 7,650,431 B2 | 1/2010 | Wang et al. |
| 7,774,348 B2 | 8/2010 | Delli Santi et al. |
| 7,836,403 B2 | 11/2010 | Viswanathan et al. |
| 7,895,178 B2 | 2/2011 | Skillen |
| 7,912,915 B1 | 3/2011 | Brin |
| 8,024,112 B2 | 9/2011 | Krumm et al. |
| 8,156,135 B2 | 4/2012 | Chi et al. |
| 8,171,048 B2 | 5/2012 | Ge et al. |
| 8,229,911 B2 | 7/2012 | Bennett |
| 8,327,273 B2 | 12/2012 | Christianson et al. |
| 8,473,507 B2 | 6/2013 | Loofbourrow et al. |
| 8,510,285 B1 | 8/2013 | Stekkelpak |
| 8,670,934 B2 | 3/2014 | Weir |
| 8,754,777 B1 | 6/2014 | Mendis |
| 8,768,616 B2 | 7/2014 | Kristinsson |
| 8,775,080 B2 | 7/2014 | Mizuno |
| 8,855,901 B2 | 10/2014 | Leader |
| 8,990,208 B2 | 3/2015 | Wang |
| 9,134,137 B2 | 9/2015 | Brush et al. |
| 9,558,283 B2 | 1/2017 | Novotny et al. |
| 9,618,343 B2 | 4/2017 | Kahn et al. |
| 9,703,804 B2 | 7/2017 | Hill et al. |
| 2003/0090515 A1 | 5/2003 | Chang et al. |
| 2005/0010647 A1 | 1/2005 | Durham |
| 2005/0086203 A1 | 4/2005 | Gauweiler |
| 2005/0131866 A1 | 6/2005 | Badros et al. |
| 2005/0204276 A1 | 9/2005 | Hosea et al. |
| 2005/0234939 A1 | 10/2005 | Arend et al. |
| 2006/0244768 A1 | 11/2006 | Witwer |
| 2006/0282304 A1 | 12/2006 | Bedard et al. |
| 2007/0008098 A1 | 1/2007 | Wong |
| 2007/0073477 A1 | 3/2007 | Krumm et al. |
| 2007/0073554 A1 | 3/2007 | Flinn |
| 2007/0112761 A1 | 5/2007 | Xu et al. |
| 2007/0266305 A1 | 11/2007 | Cong et al. |
| 2008/0018453 A1 | 1/2008 | Adler |
| 2008/0201242 A1 | 8/2008 | Minnis et al. |
| 2008/0209340 A1 | 8/2008 | Tonse et al. |
| 2008/0209350 A1 | 8/2008 | Sobotka et al. |
| 2008/0222119 A1 | 9/2008 | Dai et al. |
| 2009/0031003 A1 | 1/2009 | Velarde |
| 2009/0125517 A1 | 5/2009 | Krishnaswamy et al. |
| 2009/0204901 A1 | 8/2009 | Dharmaji et al. |
| 2009/0216563 A1 | 8/2009 | Sandoval et al. |
| 2009/0254971 A1 | 10/2009 | Herz |
| 2009/0282021 A1 | 11/2009 | Bennett |
| 2009/0287657 A1 | 11/2009 | Bennett |
| 2009/0029964 A1 | 12/2009 | Cameron et al. |
| 2010/0031335 A1 | 2/2010 | Handler |
| 2010/0145941 A1 | 6/2010 | Vasudevan et al. |
| 2010/0203876 A1 | 8/2010 | Krishnaswamy et al. |
| 2010/0295676 A1 | 11/2010 | Khachaturov et al. |
| 2010/0299325 A1 | 11/2010 | Tzvi et al. |
| 2011/0078582 A1 | 3/2011 | Christianson et al. |
| 2011/0087966 A1 | 4/2011 | Leviathan |
| 2011/0106436 A1 | 5/2011 | Bill |
| 2011/0131077 A1 | 6/2011 | Tan |
| 2011/0179154 A1 | 7/2011 | Ravichandran et al. |
| 2011/0184945 A1 | 7/2011 | Das et al. |
| 2011/0246906 A1 | 10/2011 | Caitlin et al. |
| 2011/0258556 A1 | 10/2011 | Kiciman |
| 2011/0270947 A1 | 11/2011 | Cok et al. |
| 2011/0282867 A1 | 11/2011 | Palermiti et al. |
| 2012/0023081 A1 | 1/2012 | Nayak et al. |
| 2012/0084248 A1 | 4/2012 | Gavrilescu |
| 2012/0109749 A1 | 5/2012 | Subramanian |
| 2012/0143859 A1 | 6/2012 | Lymperopoulos et al. |
| 2012/0158289 A1 | 6/2012 | Bernheim et al. |
| 2012/0159289 A1 | 6/2012 | Brush et al. |
| 2012/0295640 A1 | 11/2012 | Mei et al. |
| 2013/0046717 A1 | 2/2013 | Grigg et al. |
| 2013/0054698 A1 | 2/2013 | Lee |
| 2013/0080911 A1 | 3/2013 | Klemm |
| 2013/0097153 A1 | 4/2013 | Barbieri |
| 2013/0117208 A1 | 5/2013 | Dousse et al. |
| 2013/0122937 A1 | 5/2013 | Meyer et al. |
| 2013/0159110 A1 | 6/2013 | Rajaram et al. |
| 2013/0173398 A1 | 7/2013 | Wang et al. |
| 2013/0238432 A1 | 9/2013 | Bai |
| 2013/0260795 A1 | 10/2013 | Papakipos et al. |
| 2013/0275223 A1 | 10/2013 | Brelig et al. |
| 2013/0290827 A1 | 10/2013 | Smith et al. |
| 2013/0290862 A1 | 10/2013 | Chand et al. |
| 2013/0297688 A1 | 11/2013 | Zheng |
| 2013/0337838 A1 | 12/2013 | Kolodziej |
| 2014/0012909 A1 | 1/2014 | Sankar |
| 2014/0019441 A1 | 1/2014 | Shieh et al. |
| 2014/0025296 A1 | 1/2014 | Shimizu et al. |
| 2014/0025490 A1 | 1/2014 | Shekar |
| 2014/0025660 A1 | 1/2014 | Mohammed |
| 2014/0032325 A1 | 1/2014 | Weiss |
| 2014/0081913 A1 | 3/2014 | Peri |
| 2014/0223575 A1 | 8/2014 | Nandi |
| 2014/0279196 A1 | 9/2014 | Wilson et al. |
| 2014/0330769 A1 | 11/2014 | Nguyen et al. |
| 2014/0358427 A1 | 12/2014 | Fuhrman |
| 2014/0379521 A1 | 12/2014 | Novotny et al. |
| 2015/0052121 A1 | 2/2015 | Sharifi |
| 2015/0088904 A1 | 3/2015 | Chakrabarti |
| 2015/0106349 A1 | 4/2015 | Kitamorn et al. |
| 2015/0262282 A1 | 9/2015 | Walti |
| 2015/0269152 A1 | 9/2015 | Rekhi |
| 2016/0092695 A1 | 3/2016 | Novotny et al. |
| 2017/0083964 A1 | 3/2017 | Novotny et al. |

OTHER PUBLICATIONS

"Google Now, The Right Information at Just the Right Time", http://www.google.com/landing/now/, Sep. 17, 2013, 4 pages.

"Transit Trip Planner & Route Information System", Retrieved on: Dec. 9, 2013, Available at: http://www.transittripplanner.co.in/about.html, 2 pages.

3rd Party Application Integration, Published on: Jan. 27, 2010, Available at:http://www.ecommercepartners.net/Services/Ecommerce-Solutions/3rd-Party-ApplicationInteqration.shtml, 3 pages.

Ashbrook, et al., "Using GPS to Learn Significant Locations and Predict Movement Across Multiple Users", In the Journal of Personal and Ubiquitous Computing, vol. 7, Issue 5, Sep., 2003, 15 pages.

Bao, et al., "Helping Mobile Apps Bootstrap with Fewer Users", In Proceedings of the ACM Conference on Ubiquitous Computing, Sep. 5, 2012, 10 pages.

Bao, et al., "Location-Based and Preference-Aware Recommendation Using Sparse Geo-Social Networking Data", In Proceedings of the 20th International Conference on Advances in Geographic Information Systems, Nov. 6, 2012, 10 pages.

Bradley, Steven, "Progressive Disclosure: Presenting Information on a Need to Know Basis", Published on: Jun. 14, 2010, Available at: http://www.vanseodesign.com/web-design/progressivediscolosure/, 15 pages.

Brosso, et al., "Known User Continuous Authentication System for Consumer Application Software", In Proceedings of the 7th IEEE Conference on Consumer Communications and Networking Conference, Jan. 9, 2010, 2 pages.

(56) References Cited

OTHER PUBLICATIONS

Carousel, Published on: Jul. 15, 2009, Available at: http://developer.yahoo.com/ypatterns/selection/carousel.html, 4 pgs.
Chakraborty, et al., "Allowing Finer Control Over Privacy Using Trust as a Benchmark", In Proceedings of the IEEE Information Assurance Workshop, Jun. 21, 2006, 8 pages.
Custom Website Design and Coding of Small Business Website Solutions, Retrieved on Mar. 1, 2012, available at: http://www.usgbit.com/services.html, 4 pages.
Epelde, Gorka et al., "TV as a human interface for Ambient Intelligence environments", 2011 IEEE Int'l. Conference on Multimedia and Expo (ICME), Jul. 11, 2011, 6 pages.
Google Now, Published on: Jul. 9, 2012, Available at: http://en.wikipedia.org/wiki/Google_Now, 4 pages.
Gordon, Whitson, "Net Vibes is a Super Customizable Start Page for RSS Geeks", Published on: May 7, 2012, Available at: http://lifehacker.com/5923751/two-excellent-customizable-start-pagesworth-trvinq-now-that-iqooqles-qoinq-away, 5 pages.
Gotz, et al., "Privacy-Aware Personalization for Mobile Advertising", in Proceedings of the ACM Conference on Computer and Communications Security, Aug. 2011, 14 pages.
Hochleitner, et al., "Making Devices Trustworthy: Security and Trust Feedback in the Internet of Things", In Proceedings of the Fourth International Workshop on Security and Privacy in Spontaneous Interaction and Mobile Phone Use, Jun. 18, 2012, 6 pages.
Horozov, et al., "Using Location for Personalized POI Recommendations in Mobile Environments", In Proceedings of the International Symposium on Applications on Internet, Jan. 23, 2006, 7 pages.
iGoogle, Published on: May 2005, Available at: http://en.wikipedia.org/wiki/Igoogle, 4 pages.
Jan-Erik Ekberg (Saxena), Secure Device Pairing based on a Visual Channel; Year: 2011; Nokia Research Center, Helsinki, 17 pages.
Lawler, Ryan, "Location-Based Mobile App Alike Recommends nearby Venues that are Just like Your Favorites", Published on: Oct. 9, 2012 Available at: http://techcrunch.com/2012/10/09/alike/, 8 pages.
Miluzzo, et al., "Darwin Phones: the Evolution of Sensing and Inference on Mobile Phones", In Proceedings of the 8th International Conference on Mobile Systems, Applications, and Services, Jun. 15, 2010, 16 pages.
Pageflakes, Published on: Dec. 11, 2005, Available at: http://www.crunchbase.com/company/pageflakes, 2 pages.
PCT 2nd Written Opinion in PCT/US2014/059986, dated Sep. 15, 2015, 6 pages.
PCT 2nd Written Opinion in PCT/US2015/020312, dated Feb. 22, 2016, 7 pages.
PCT International Search Report in PCT/US2013/037871, dated Oct. 17, 2013, 8 pages.
PCT International Search Report in PCT/US2014/059986, dated Jan. 30, 2015, 9 pages.
PCT International Search Report in PCT/US2014/069172, dated Jun. 23, 2015, 8 pages.
PCT International Search Report in PCT/US2015/020312, dated May 11, 2015, 11 pages.
Roggen, et al., "Recognition of Crowd Behavior from Mobile Sensors with Pattern Analysis and Graph Clustering Methods", In Journal of Networks and Heterogeneous Media, vol. 6, No. 3, Sep. 2011, 24 pages.
Santos, et al., "Context Inference for Mobile Applications in the UPCASE Project", In: Proceeding of 2nd International Conference on Mobile Wireless Middleware, Operating Systems, and Applications, Apr. 28, 2009, 14 pages.
U.S. Appl. No. 13/458,515, Amendment and Response filed Oct. 3, 2014, 13 pages.
U.S. Appl. No. 13/458,515, Office Action dated Jul. 15, 2014, 13 pages.
U.S. Appl. No. 13/458,515, Office Action dated Jan. 5, 2015, 16 pages.
U.S. Appl. No. 13/536,603, Amendment and Response filed Jun. 24, 2014, 21 pages.
U.S. Appl. No. 13/536,603, Amendment and Response filed Jan. 23, 2015, 19 pages.
U.S. Appl. No. 13/536,603, Amendment and Response filed Feb. 5, 2016, 20 pages.
U.S. Appl. No. 13/536,603, Office Action dated Jan. 31, 2014, 21 pages.
U.S. Appl. No. 13/536,603, Office Action dated Oct. 1, 2014, 26 pages.
U.S. Appl. No. 13/536,603, Office Action dated Sep. 16, 2015, 23 pages.
U.S. Appl. No. 13/536,603, Office Action dated May 4, 2016, 28 pages.
U.S. Appl. No. 13/920,866, filed May 18, 2013, 44 pages.
U.S. Appl. No. 14/052,763, Amendment and Response filed Jun. 10, 2016, 14 pages.
U.S. Appl. No. 14/052,763, Office Action dated Dec. 10, 2015, 10 pages.
U.S. Appl. No. 14/052,763, Office Action dated Sep. 8, 2016, 12 pages.
U.S. Appl. No. 14/105,095, Amendment and Response filed May 19, 2015, 12 pages.
U.S. Appl. No. 14/105,095, Amendment and Response filed Nov. 6, 2015, 12 pages.
U.S. Appl. No. 14/105,095, Notice of Allowance dated Jul. 19, 2016, 8 pages.
U.S. Appl. No. 14/105,095, Office Action dated Jul. 6, 2015, 14 pages.
U.S. Appl. No. 14/105,095, Office Action dated Feb. 19, 2016, 18 pages.
U.S. Appl. No. 14/217,643, Amendment and Response filed Mar. 7, 2016, 12 pages.
U.S. Appl. No. 14/217,643, Amendment and Response filed Jul. 25, 2016, 14 pages.
U.S. Appl. No. 14/217,643, Office Action dated Nov. 5, 2015, 10 pages.
U.S. Appl. No. 14/217,643, Office Action dated Apr. 25, 2016, 11 pages.
U.S. Appl. No. 14/498,846, Amendment and Response filed Apr. 25, 2016, 15 pages.
U.S. Appl. No. 14/498,846, Office Action dated Jan. 15, 2016, 12 pages.
U.S. Appl. No. 14/498,846, Office Action dated Aug. 10, 2016, 11 pages.
U.S. Appl. No. 14/498,946, Notice of Allowance dated Sep. 30, 2016, 12 pages.
U.S. Appl. No. 14/498,946, Office Action dated Sep. 22, 2016, 12 pages.
Web Hosting Features, Published on: Jun. 24, 2011, Available at: http://smallbusiness.yahoo.com/webhostinq/features#.uni, 3 pages.
Web Integration Services, Published on: Aug. 14, 2010, Available at: htto://www.deversus.com/services/web-intearation/, 3 pages.
Word Press Development, Retrieved on Mar. 1, 2012, available at:http://www.intearatedweb.com.au/our-services/wordoress-develooment/, 3 pages.
Zerkouk, et al., "A User Profile Based Access Control Model and Architecture", In International Journal of Computer Networks & Communications, vol. 5, Issue 1, Jan. 2013, 11 pages.
U.S. Appl. No. 14/217,643, Office Action dated Oct. 20, 2016, 12 pages.
U.S. Appl. No. 14/105,095, Notice of Allowance dated Dec. 9, 2016, 7 pages.
U.S. Appl. No. 14/105,095, Notice of Allowance dated Jan. 30, 2017, 2 pages.
U.S. Appl. No. 14/217,643, Amendment and Response filed Mar. 20, 2017, 16 pages.
U.S. Appl. No. 14/217,643, Office Action dated Jun. 13, 2017, 20 pages.
Guy, Ido et al., "Social Media Recommendation based on People and Tags", IBM, 1995, pp. 194-201.
U.S. Appl. No. 15/365,153, Office Action dated Sep. 29, 2017, 13 pages.

(56) References Cited

OTHER PUBLICATIONS

Mathew, et al., "Predicting Future Locations with Hidden Markov Models", In Proceeding of the ACM International Joint Conference on Pervasive and Ubiquitous Computing, Sep. 5, 2012, 8 Pages.
U.S. Appl. No. 14/217,643, Amendment and Response filed Nov. 13, 2017, 16 pages.
U.S. Appl. No. 15/365,153, Amendment and Response filed Nov. 30, 2017, 15 pages.
U.S. Appl. No. 15/365,153, Office Action dated Jan. 16, 2018, 12 pages.
U.S. Appl. No. 14/217,643, Office Action dated Dec. 28, 2017, 17 pages.

PREDICTED TRAVEL INTENT

CROSS-REFERENCE TO RELATED APPLICATIONS

This application is a continuation of U.S. application Ser. No. 14/105,095, now U.S. Pat. No. 9,618,343, filed Dec. 12, 2013, titled "PREDICTED TRAVEL INTENT," which is hereby incorporated by reference in its entirety. To the extent appropriate, the present application claims priority to the above-referenced application.

BACKGROUND

Many users may utilize a search interface, such as a search app, a search website, a social network, etc., to research and/or plan a trip. In an example, a user may search a social network for vacation images for Venice Beach. The user may submit various search queries relating to hotels, air flights, car rental agencies, attractions, and/or other information for Venice Beach through a search website. The search website may provide the user with search results that the user may explore and/or bookmark for later access. The user may call various travel accommodation and entertainment businesses while planning the Venice Beach trip. In this way, the user may research and plan a trip through search interfaces and/or devices (e.g., phone calls through a mobile device; map directions through a mobile map app; etc.).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing a recommendation based upon a predicted travel intent are provided herein. For example, a set of user signals, indicative of an intent for a user to travel to a destination, may be identified based upon a variety of information associated with the user and/or devices used by the user. For example, a user signal may correspond to location information associated with a device (e.g., GPS check-in data obtained when the device accesses a website), search query history (e.g., a query for flights, hotels, locations, attractions, businesses, events, and/or other travel and/or destination information), user browsing history, messages associated with the user, social network posts by the user (e.g., the user may post about a desire to go on a vacation), a calendar entry (e.g., the user may have an entry about meeting with a travel agent or renting a car), a phone call (e.g., a phone call log entry to a hotel reservation company), etc. The set of user signals may be evaluated to determine a predicted travel intent for the user to travel to a destination (e.g., a classifier may be used to identify features indicative of travel, such as by evaluating search terms of queries submitted by the user to identify a location that is a threshold distance away from the user). In an example, a predicted travel date may be derived from the set of user signals. The predicted travel date may be used to identify events (e.g., skiing in winter, fishing season, a baseball game during a baseball season), flights, hotel availability, etc.

It may be appreciated that in one example, a destination may correspond to multiple locations, and is not limited to a single location. In an example, a vacation destination may comprise a cross country trip that includes Las Vegas, the Grand Canyon, San Francisco, and/or a cruise leaving from San Francisco (e.g., the set of user search signals may comprise search terms relating to long distance car rentals, Las Vegas, the Grand Canyon, San Francisco, a cruise line, etc.). In another example, a Europe destination may comprise a local airport, an airport in Rome, Rome, a train ride to Germany, Germany, and/or other locations in Europe (e.g., the set of user search signals may comprise search terms relating to Rome, Germany, and/or other European locations). In this way, the predicted travel intent may correspond to a destination encompassing one or more locations. It may also be appreciated that a user may not end up travelling to the destination and/or the user may travel to some (e.g., one or more) but not all locations associated with the destination.

One or more recommendations may be created based upon the predicted travel intent. A recommendation may comprise weather information, attraction information (e.g., an amusement park), travel accommodation information (e.g., a link to a hotel reservation app), an event at the destination (e.g., a baseball game during a baseball season, a festival, etc.), a news story associated with the destination, a social network photo associated with the destination, a travel route, and/or a plethora of other content and/or information associated with traveling to the destination. In an example, the recommendation may be pushed to a device of the user (e.g., an alert on a mobile device). In another example, the recommendation may be provided as a message through a message system (e.g., email, text, etc.). In another example, the recommendation may be provided through a calendar or task interface. In another example, the recommendation and/or the predicted travel intent may be used to influence information provided by a website. For example, a search engine website may provide one or more information interfaces (e.g., a carousel of news stories provided by a homepage of a search engine website) that may comprise content derived from the recommendation and/or the predicted travel intent (e.g., a celebrity news story may be replaced with a local news story for the destination). In another example, a search engine results page (SERP) may be modified based upon the recommendation and/or the predicted travel intent (e.g., a search result suggestion may correspond to a business at the destination). In another example, a travel interface (e.g., displayed by a website or a mobile app such as a search app hosted on a mobile device) may be provided. The travel interface may be populated with information (e.g., weather, attractions, travel accommodations, selectable interests, travel dates, travel route planning information, social network photos of the destination, and/or a wide variety of other information) associated with the destination.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for providing a recommendation based upon a predicted travel intent are provided. For example, a predicted travel intent that a user will travel to a destination may be determined. The predicted travel intent may be used to generate recommendations (e.g., a recommendation to book a theatre show the weekend that the user may travel to the destination), populate a travel interface (e.g., a mobile app and/or a website may provide travel accommodation information, weather, attraction information, travel planning functionality, and/or a variety of other information and/or functionality associated with traveling to the destination), and/or may be used to influence that selection of information that is provided by app and/or websites (e.g., a website may modify news interfaces with information associated with the destination).

Figure 1:
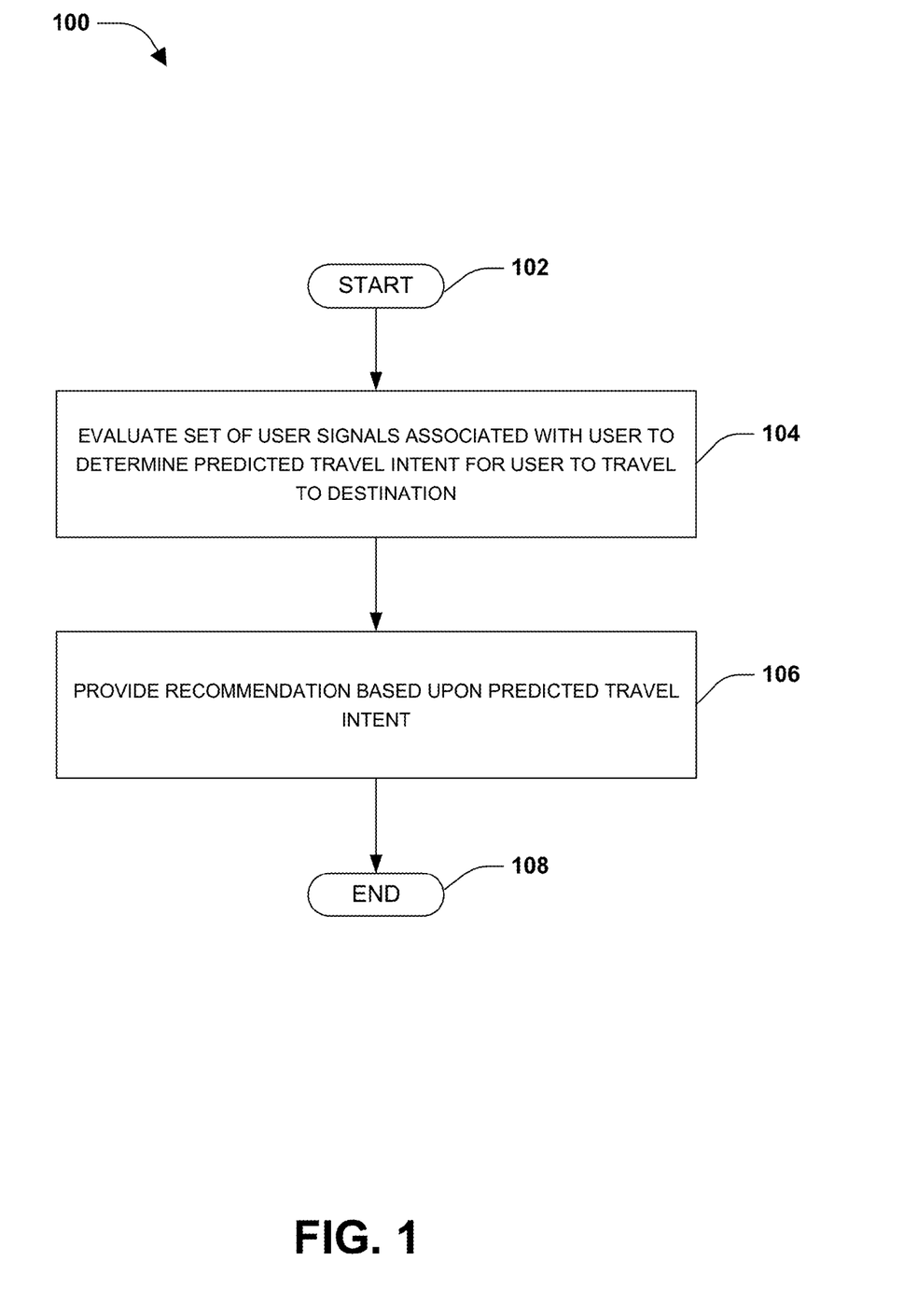
FIG. 1 is a flow diagram illustrating an exemplary method of providing a recommendation based upon a predicted travel intent.

An embodiment of providing a recommendation based upon a predicted travel intent is illustrated by an exemplary method 100 of FIG. 1. At 102, the method starts. At 104, a set of user signals associated with a user may be evaluated to determine a predicted travel intent for the user to travel to a destination. The set of user signals may comprise locational information associated with a device of the user (e.g., GPS check-in data, social network check-in data, locational information provided to websites, etc.), a search query history associated with the user (e.g., search queries and/or visited websites corresponding to flights, hotels, locations, attractions, businesses, events, etc.), a message, a phone number called by the user, a social network post, content marked by the user through a social network (e.g., a "pinned" or marked image or website), a calendar entry, and/or any other information or user created data (e.g., a folder or document indicative of a location or traveling). In an example, a classifier and/or a travel training dataset (e.g., search queries submitted by users and/or destinations traveled to by such users, such that the travel training dataset may be indicative of search queries associated with users researching destinations that were actually traveled to by the users) may be utilized to identify features associated with the set of user signals (e.g., search terms, within search queries submitted by the user, that correspond to potential destinations and/or relate to traveling, such as "flight", "baggage weight limit", "traveling with a child", "time zone change", "best hotels", "vacation", and/or other query terms). The classifier may assign an intent to travel score to a potential destination. If the intent to travel score is above a travel threshold, then the potential destination may be determined as the destination to which the user has an intent to travel.

In an example, the destination may correspond to multiple locations (e.g., a trip to LA may involve the beach, an amusement park, and/or other locations near or outside of LA). For example, the set of user signals may be evaluated to identify a set of potential travel locations (e.g., the user may search for "LA vacations", a particular "amusement park outside of LA", a "what beaches are within an hour of LA", and/or other search queries corresponding to locations that may be associated with LA). The set of potential locations may be clustered to create one or more location clusters. In an example, a location cluster comprises one or more potential travel locations of the set of potential travel locations (e.g., LA, a neighboring city comprising the beach, and a neighboring city comprising the amusement park). The destination may be identified based upon the location cluster. For example, the destination may comprise one or more potential travel locations within the location cluster. That is, the destination may correspond to just some of or all of the potential travel locations within the location cluster.

In an example, a set of historical user location data associated with a device of the user may be evaluated to determine a user hub at which the user is located for a threshold percentage of time (e.g., home, work, etc.). Responsive to a potential destination (e.g., identified from the set of user signals) being a threshold distance from the user hub (e.g., at least 50 miles away), the potential destination may be determined as the destination. Responsive to the potential destination not being the threshold distance from the user hub (e.g., less than 50 miles away), the potential destination may not be determined as the destination. In this way, the threshold distance may bet set with a value that corresponds to a threshold amount of traveling that the user will undertake for a potential destination to be considered a travel destination.

In an example, a potential travel date may be determined for the predicted travel intent based upon a global approximate travel timeline (e.g., users may approximately begin traveling after 10 days from identification of a predicted travel intent) and/or based upon an evaluation of the set of user signals (e.g., the user may submit a search query "beach cottage rates for May", "information about the weeklong summer apple festival in LA", etc.). The potential travel date may be used to tailor the predicted travel intent and/or recommendations provided for the predicted travel intent (e.g., events occurring at a particular time such as a ski lodge being open; current rates for travel accommodations such as flights or hotel, and/or other time sensitive information).

At 106, a recommendation may be provided based upon the predicted travel intent. The recommendation may comprise a photo from a social network (e.g., a friend of the user may have uploaded a photo of a vacation to LA), an image associated with the destination, a news story associated with the destination, an event at the destination (e.g., a summer festival), an advertisement for a business associated with the destination (e.g., a beach resort lodge), a website link to a website (e.g., a hotel reservation website), an app link to a mobile app (e.g., a travel app), a social network link to a social network profile of an entity associated with the destination (e.g., a sports team that is playing during the potential travel date), an attraction at the destination, and/or a variety of other travel task completion information (e.g., hotel reservation functionality, travel planning functionality, sports tickets to a sporting event at the destination during the potential travel date where the sporting event is identified as being interesting to the user based upon a social network profile of the user, etc.).

The recommendation may be displayed through an alert (e.g., an alert message through a mobile device), an operating system user interface (e.g., an operating system welcome screen, an operating system search charm, etc.), a mobile app, a website, a search engine homepage (e.g., a news interface may be populated with a news story for the destination), a carousel interface (e.g., a website interface through which the user may browse, such as "flip through", various information associated with the destination), etc. In an example, the recommendation may be provided from a client device to the user (e.g., a mobile search app may identify the predicted travel intent and/or may provide the recommendation through the client device hosting the mobile search app). In another example, the recommendation may be provided to the client device for display to the user (e.g., a search engine server may identify the predicted travel intent based upon search queries submitted to a search engine website hosted by the search engine server and/or may provide the recommendation to the client device such as by displaying the recommendation through the search engine website accessed by a web browser hosted by the client device).

In an example of providing the recommendation, a user interface comprising a set of information interfaces may be identified (e.g., a website comprising a news story carousel, an operating system comprising information tiles, etc.). In another example of providing the recommendation, a travel interface may be populated with the recommendation (e.g., a mobile app, such as a travel app, may display the travel interface populated with the recommendation). In an example, the travel interface may be populated with a confirmable question as to whether the predicted travel intent is correct (e.g., the user may be solicited to enter various information used to adjust and/or elaborate on the predicted travel intent). The travel interface may be populated with a variety of information and/or functionality associated with the destination and/or traveling to the destination. For example, the travel interface may be populated with weather information for the destination, an attraction interface for the destination (e.g., an attraction name, an attraction description, an attraction image, and/or an ability to book tickets for the attraction), a travel accommodation interface for the destination (e.g., a name, image, description, and/or reservation functionality for a hotel, car rental business, and/or airline), a selectable interest interface associated with an interest (e.g., the user may select sports, shopping, running, biking, beaches, skiing, and/or a variety of interests that may be used to tailor recommendations provided for the predicted travel intent), a travel data input interface, a travel route planning interface (e.g., an interactive map), a configuration interface (e.g., the user may tailor the predicted travel intent and/or information recommended to the user for the predicted travel intent), and/or a supplemental information interface (e.g., a link to a travel planning app, a link to a website, a photo of the destination, user reviews for restaurants at the destination, and/or a plethora of other supplemental content). At 108, the method ends.

Figure 2:
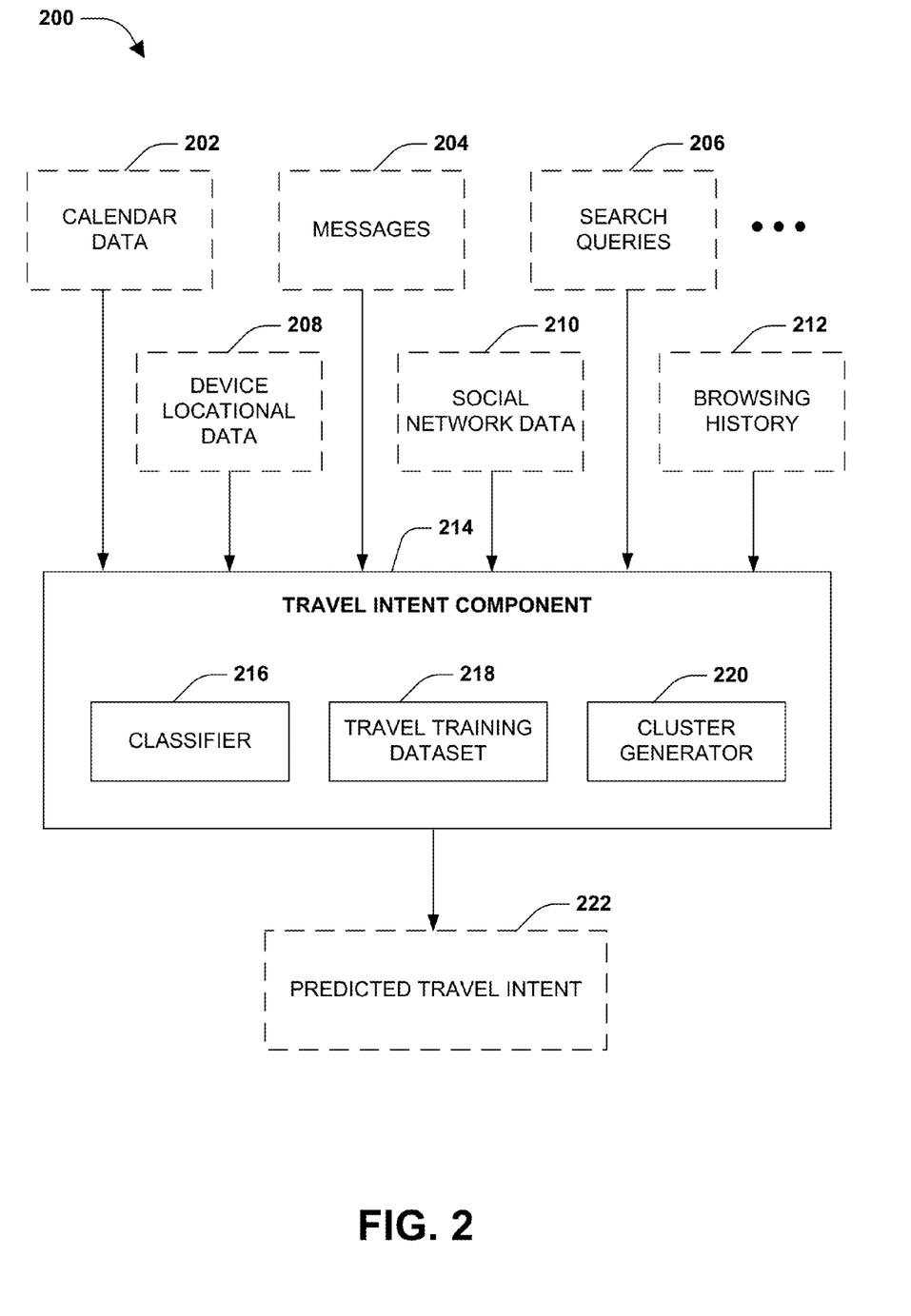
FIG. 2 is a component block diagram illustrating an exemplary system for identifying a predicted travel intent.

FIG. 2 illustrates an example of a system 200 for identifying a predicted travel intent 222. The system 200 may comprise a travel intent component 214. In an example, the travel intent component 214 may be hosted on a client device of a user (e.g., the travel intent component 214 may be associated with a search app hosted by the client device). In another example, the travel intent component 214 may be hosted on a server (e.g., a search engine server hosting a search engine through which the user may search for content). The travel intent component 214 may be configured to evaluate a set of user signals, such as calendar data 202, messages 204, search queries 206, device locational data 208, social network data 210, browsing history 212, and/or a wide variety of other information that may be evaluated to identify a predicted travel intent for the user to travel to a destination. For example, a classifier 216 and/or a travel training dataset 218 (e.g., search queries submitted by users and/or destinations traveled to by such users, such that the travel training dataset may be indicative of search queries associated with users researching destinations that were actually traveled to by the users) may be used to evaluate the set of user signals to identify potential locations that may be identified as the destination (e.g., intent to travel scores may be assigned to potential locations derived from features extracted from textual and/or visual information of the set of user signals). A cluster generator 220 may be used to cluster potential locations (e.g., identified from the set of user signals) into a location cluster that may be used to identify the destination (e.g., the destination may correspond to one or more potential locations of the location cluster). In this way, the travel intent component 214 may identify the predicted travel intent 222.

Figure 3:
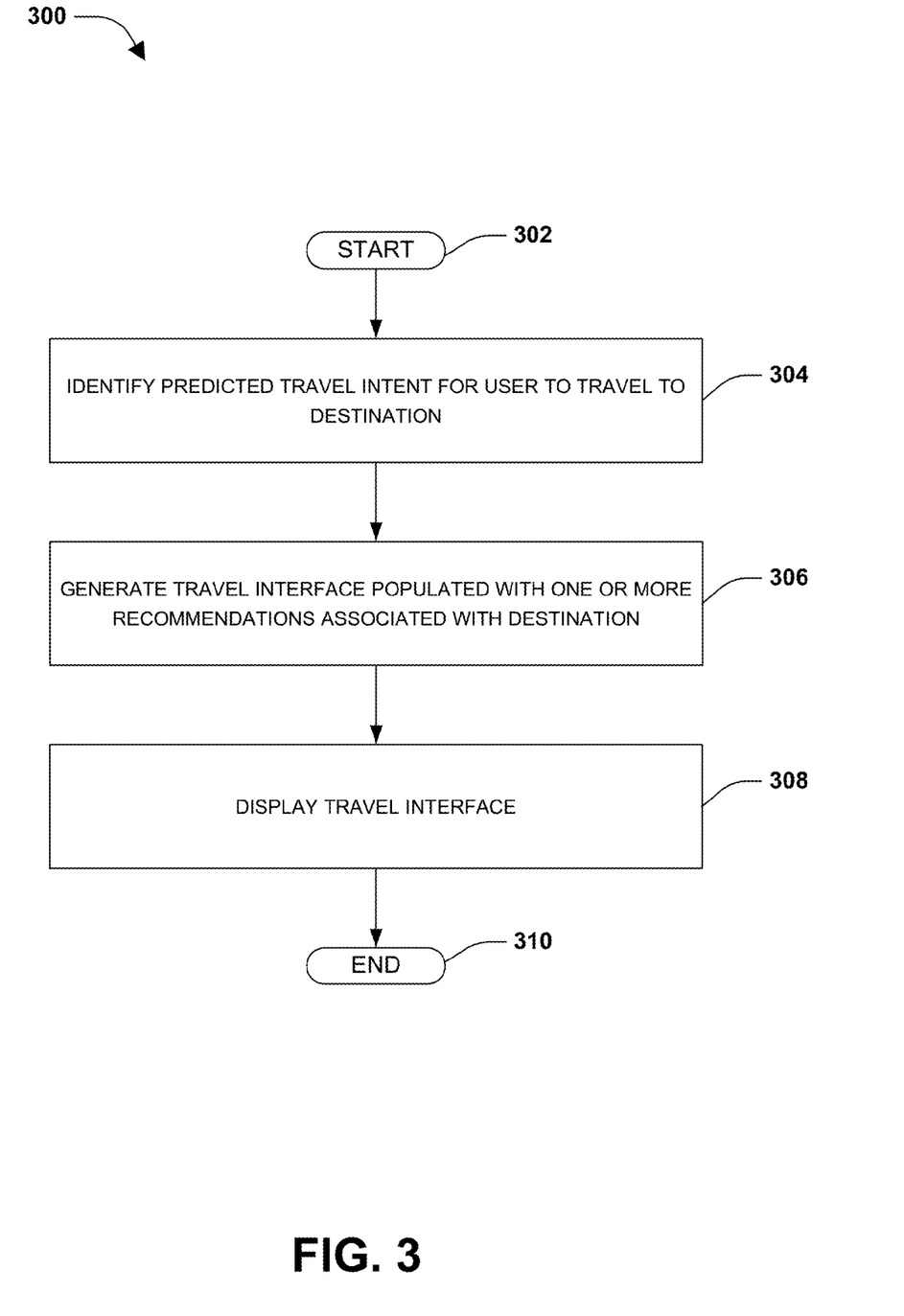
FIG. 3 is a flow diagram illustrating an exemplary method of providing a recommendation based upon a predicted travel intent.

An embodiment of displaying a travel interface is illustrated by an exemplary method 300 of FIG. 3. At 302, the method starts. At 304, a predicted travel intent for a user to travel to a destination is identified (e.g., search queries submitted by the user may be evaluated to identify features indicative of locations that may be at least a threshold distance away from a user hub, such as a home or residence, of the user). At 306, a travel interface, populated with one or more recommendations associated with the destination, may be generated. The recommendation may comprise at least one of an image, weather information, attraction information, event information, advertisements, news stories, and/or travel task completion information associated with the destination (e.g., functionality to book a flight, rent a car, book a hotel, purchase a train ticket, purchase football game tickets, purchase amusement park tickets, schedule a visit to a museum, etc.). At 308, the travel interface may be provided through at least one of an operating system user interface (e.g., a search charm, a welcome screen, a home screen, etc.), a mobile app (e.g., a travel app, a search app, a reservation app, etc.), or a website (e.g., integrated into a search engine results page or a search engine homepage). At 310, the method ends.

Figure 4:
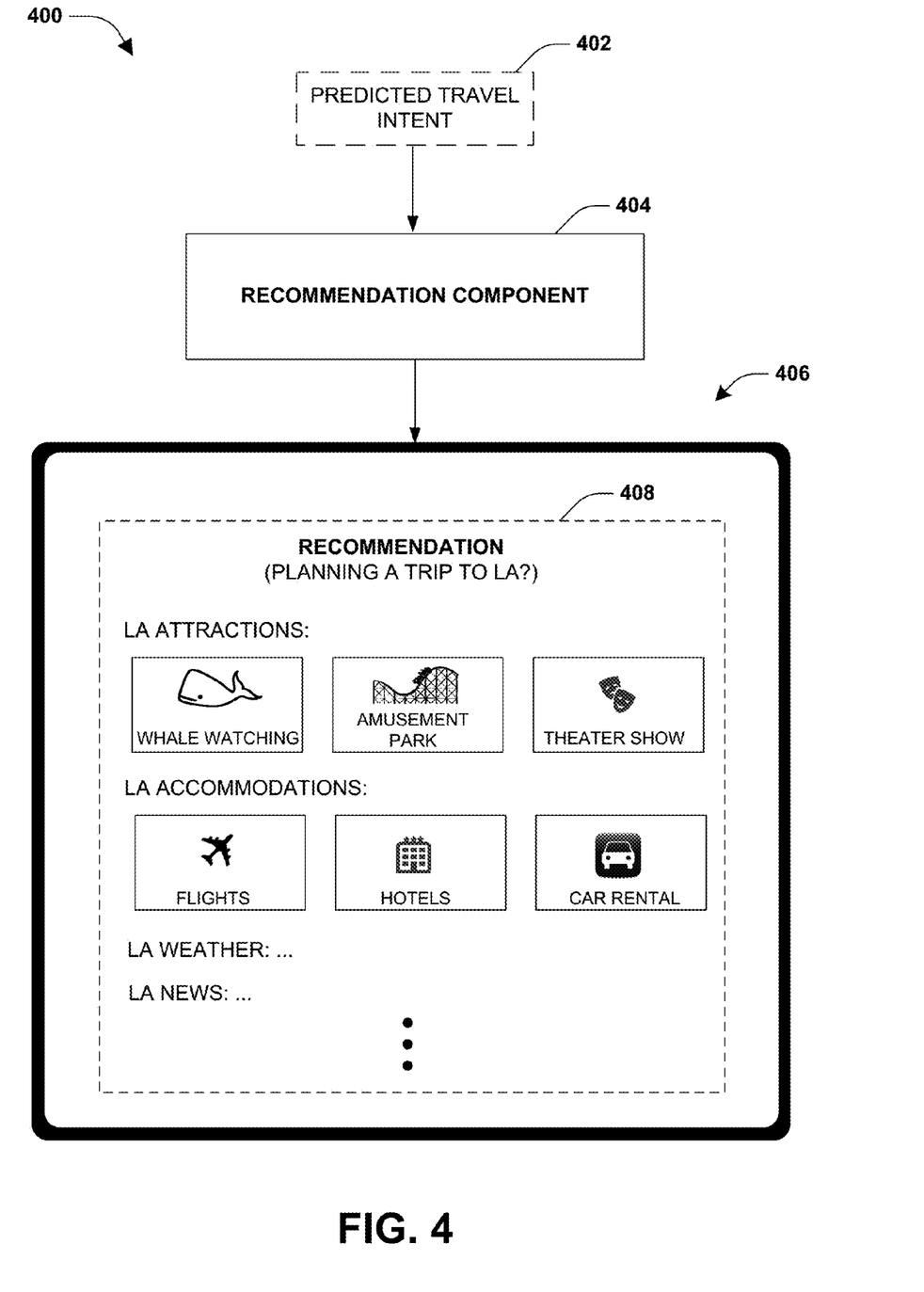
FIG. 4 is a component block diagram illustrating an exemplary system for providing a recommendation alert associated with a predicted travel intent for a user to travel to a destination.

FIG. 4 illustrates an example of a system 400 for providing a recommendation as a recommendation alert 408 associated with a predicted travel intent 402 for a user to travel to a destination. The system 400 comprises a recommendation component 404 associated with the predicted travel intent 402 (e.g., corresponding to a predicted travel intent 222 identified by a travel intent component 214 of FIG. 2). The recommendation component 404 may be configured to generate the recommendation alert 408 for the predicted travel intent 402. For example, the predicted travel intent 402 may correspond to a predicted intent that the user may be planning a trip to LA. The recommendation component 404 may populate the recommendation alert 408 with one or more LA attraction interfaces (e.g., information and/or reservation functionality regarding whale watching, an amusement park, a theater show, and/or other attractions around LA), LA accommodation interfaces (e.g., information and/or reservation functionality regarding flights, hotels, car rentals, etc.), LA weather, LA news stories, and/or a variety of other information. In this way, the recommendation component 404 may display the recommendation alert 408 through a device 406 to the user.

Figure 5:
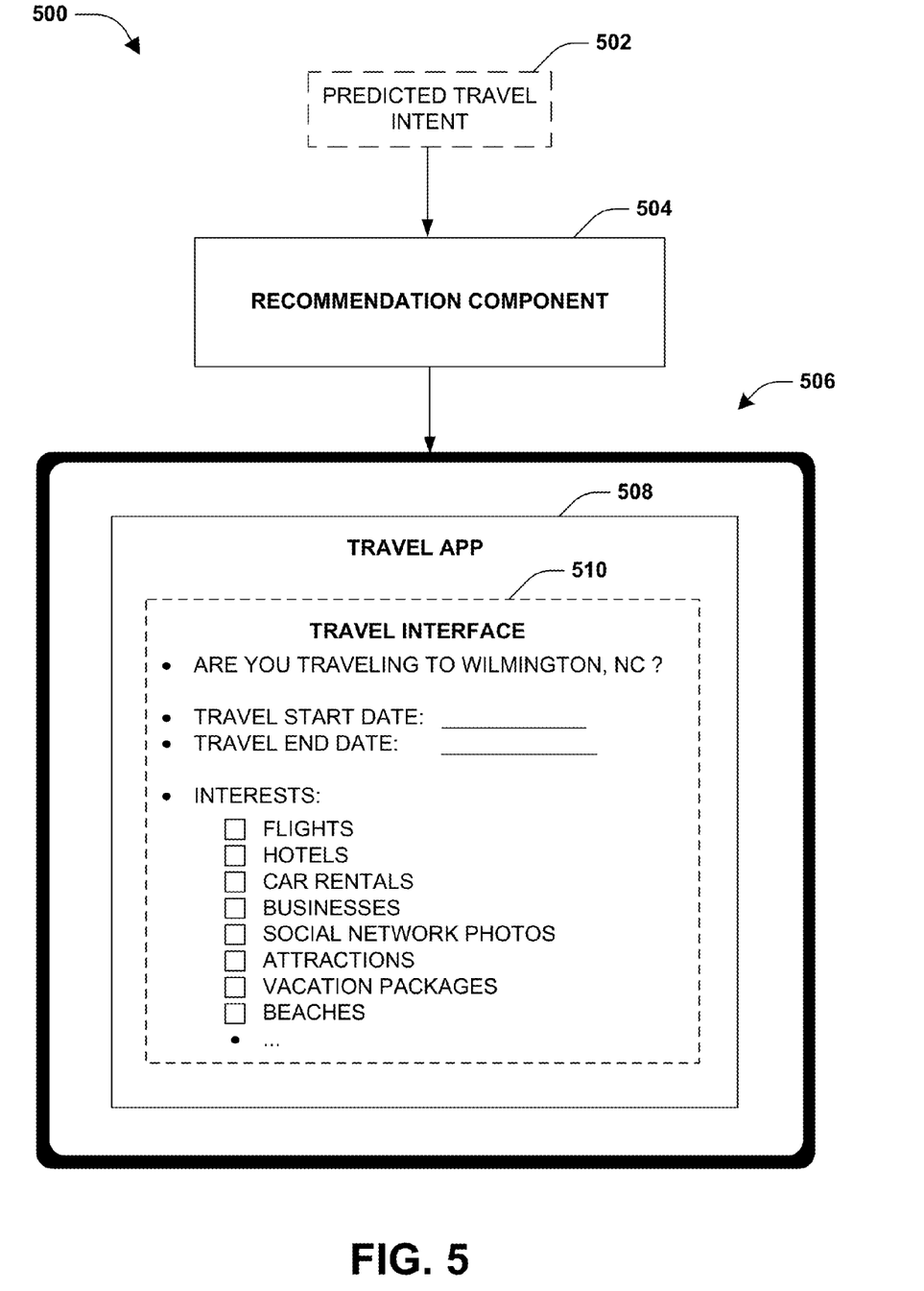
FIG. 5 is a component block diagram illustrating an exemplary system for providing a travel interface populated with a recommendation associated with a predicted travel intent for a user to travel to a destination.

FIG. 5 illustrates an example of a system 500 for providing a travel interface 510 populated with a recommendation associated with a predicted travel intent 502 for a user to travel to a destination. The system 500 comprises a recommendation component 504 associated with the predicted travel intent 502 (e.g., corresponding to a predicted travel intent 222 identified by a travel intent component 214 of FIG. 2). The recommendation component 504 may be configured to generate the travel interface 510 and/or display the travel interface 510 through a travel app 508 hosted on a device 506 of the user. The recommendation component 504 may populate the travel interface 510 with a variety of recommendation information associated with the predicted travel intent 502, such as a confirmable question as to whether the user is traveling to Wilmington, N.C., a travel start date, a travel end date, and/or a selectable interest interface through which the user may select various interests that may be used to tailor what information about the destination is provided to the user.

Figure 6:
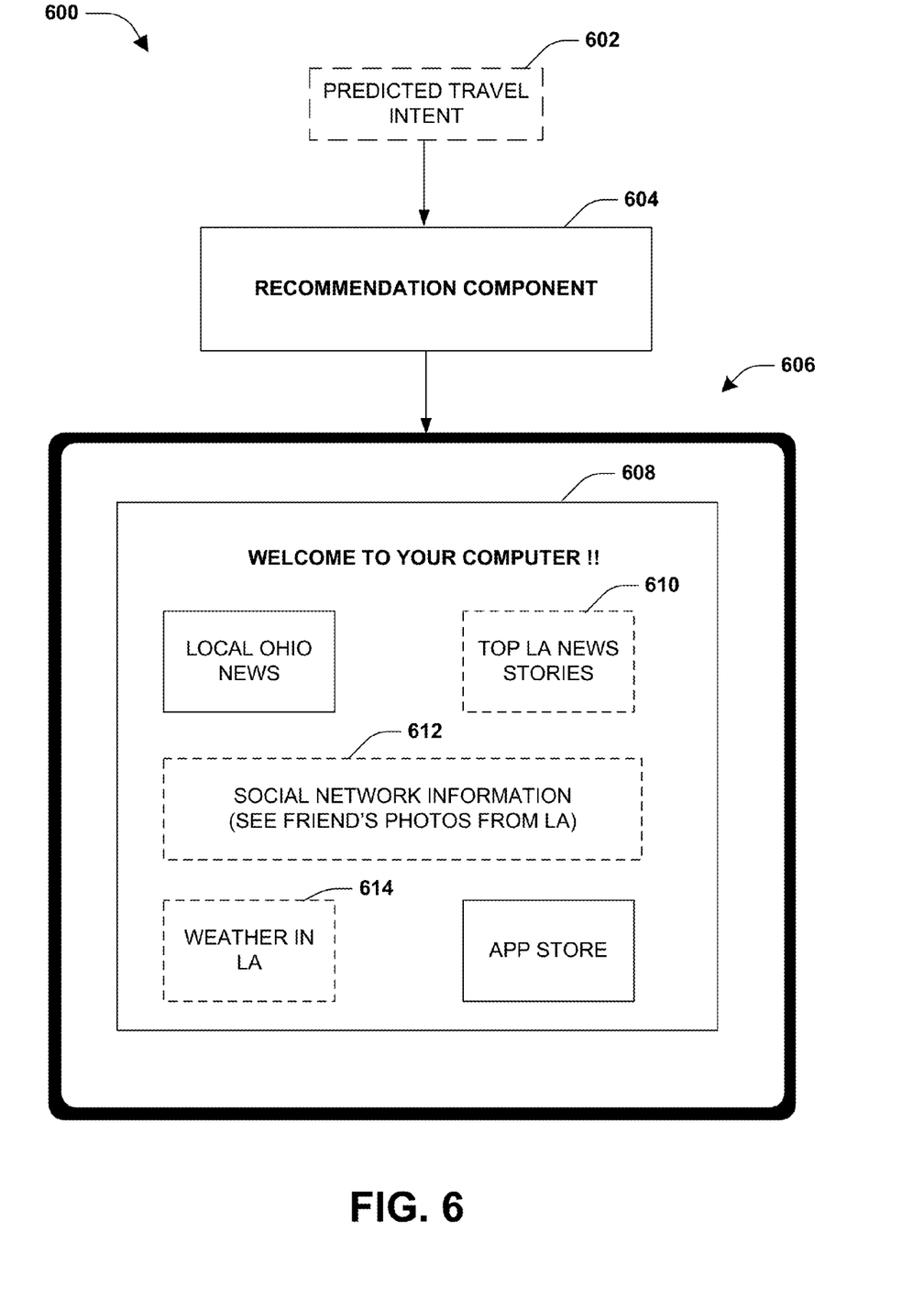
FIG. 6 is a component block diagram illustrating an exemplary system for modifying an operating system interface of a device based upon a predicted travel intent for a user to travel to a destination.

FIG. 6 illustrates an example of a system 600 for modifying an operating system interface 608 of a device 606 based upon a predicted travel intent 602 for a user to travel to a destination. The system 600 comprises a recommendation component 604 associated with the predicted travel intent 602 (e.g., corresponding to a predicted travel intent 222 identified by a travel intent component 214 of FIG. 2). The recommendation component 604 may be configured to modify one or more information interfaces of the operating system interface 608 based upon the predicted travel intent 602. For example, a first information tile 610 may be modified to comprise top LA news stories based upon the predicted travel intent 602 indicating an intent for the user to travel to LA. A second information tile 612 may be modified to comprise social network information, such as friend's photos for LA, based upon the predicted travel intent 602. A third information tile 614 may be modified to comprise weather for LA based upon the predicted travel intent 602.

Figure 7:
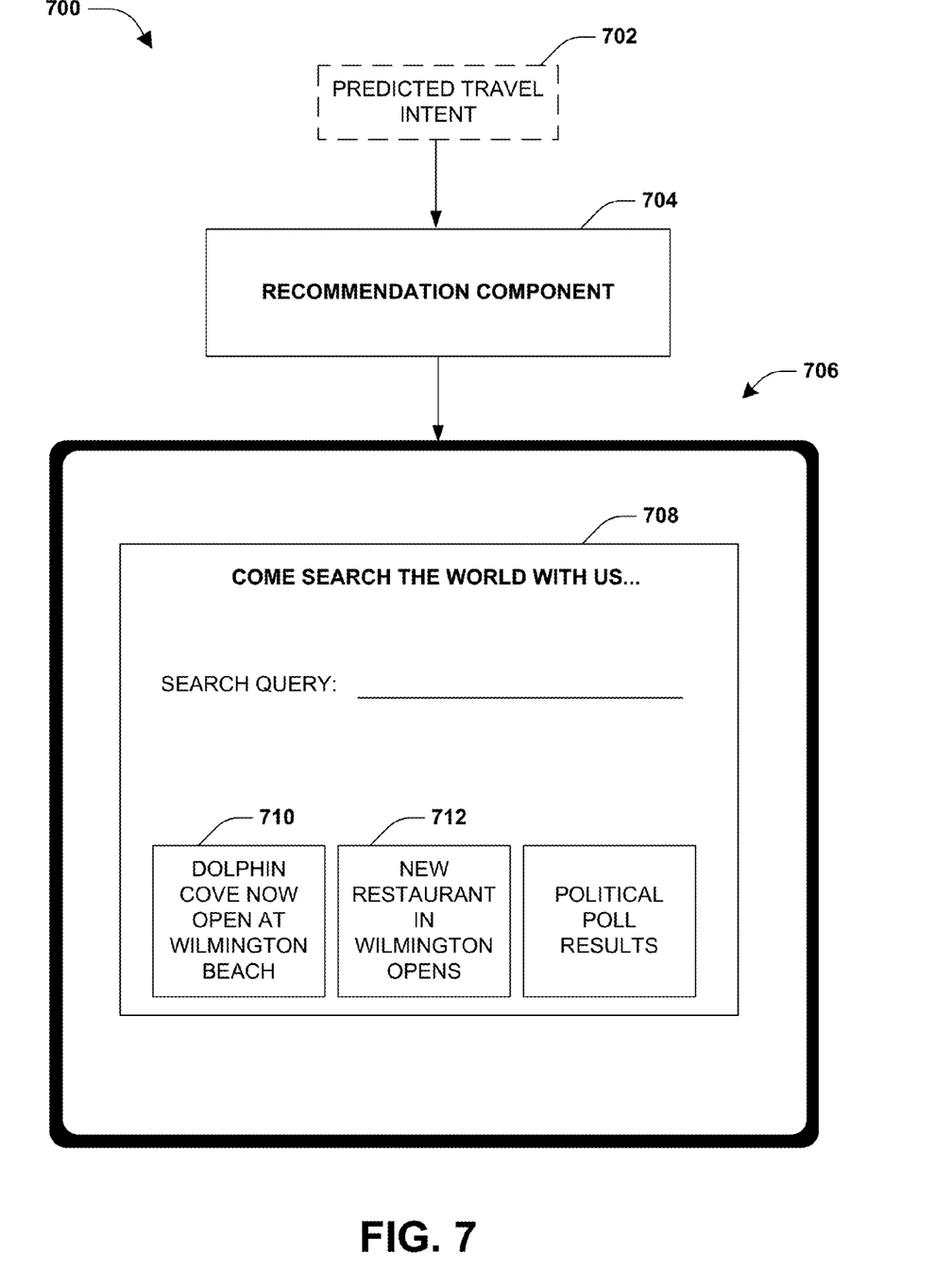
FIG. 7 is a component block diagram illustrating an exemplary system for modifying a search engine website based upon a predicted travel intent for a user to travel to a destination.

FIG. 7 illustrates an example of a system 700 for modifying a search engine website 708 based upon a predicted travel intent 702 for a user to travel to a destination. The system 700 comprises a recommendation component 704 associated with the predicted travel intent 702 (e.g., corresponding to a predicted travel intent 222 identified by a travel intent component 214 of FIG. 2). The recommendation component 704 may be configured to modify one or more information interfaces of the search engine website 708 based upon the predicted travel intent 702. For example, a first information tile 710 may be modified to comprise news information about a dolphin cove exhibit opening at Wilmington beach based upon the predicted travel intent 702 indicating an intent for the user to travel to Wilmington, N.C. A second information tile 712 may be modified to comprise news information about a new restaurant opening in Wilmington based upon the predicted travel intent 702.

Figure 8:
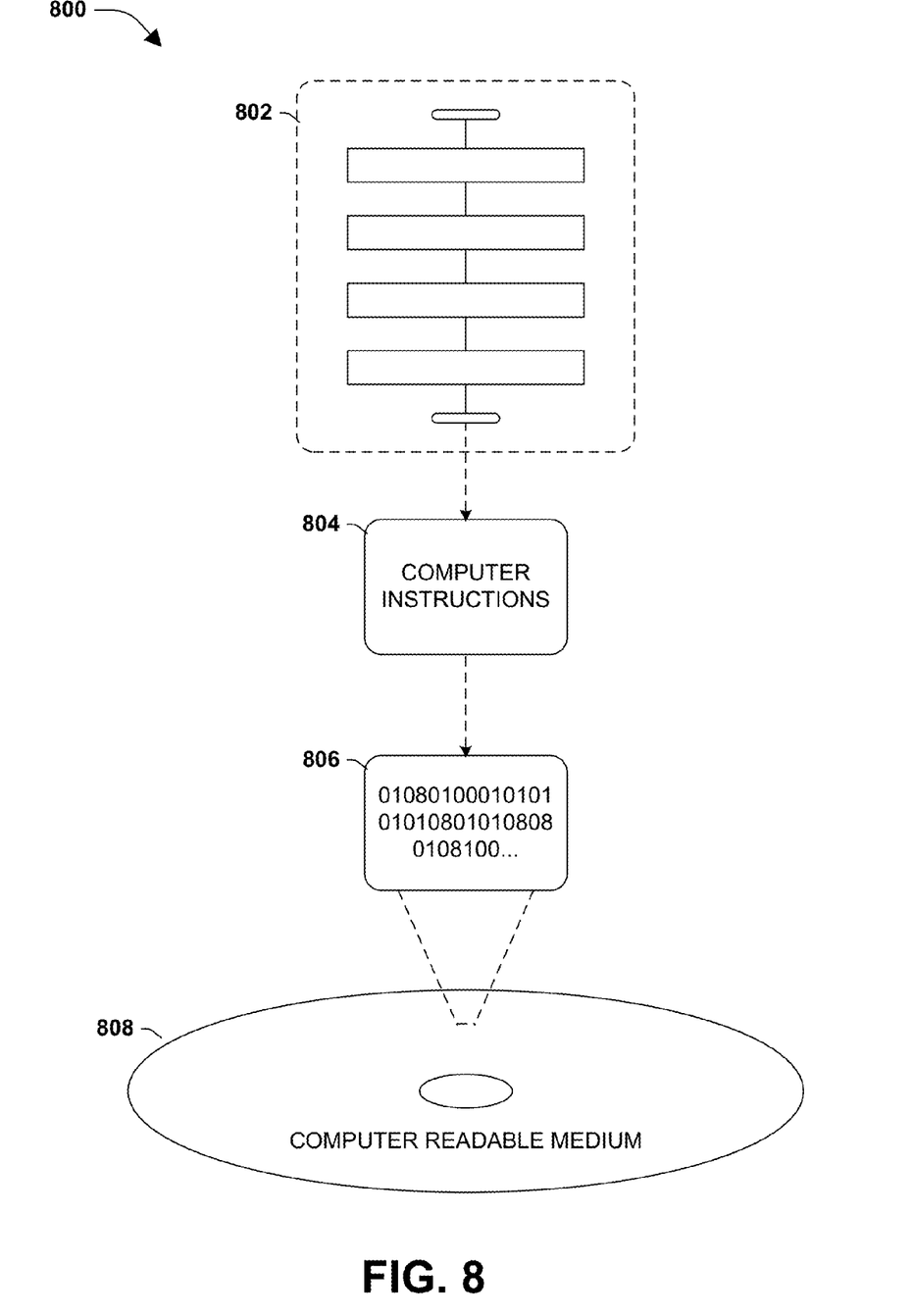
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1 and/or at least some of the exemplary method 300 of FIG. 3, for example. In some embodiments, the processor-executable instructions 804 are configured to implement a system, such as at least some of the exemplary system 200 of FIG. 2, at least some of the exemplary system 400 of FIG. 4, at least some of the exemplary system 500 of FIG. 5, at least some of the exemplary system 600 of FIG. 6, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
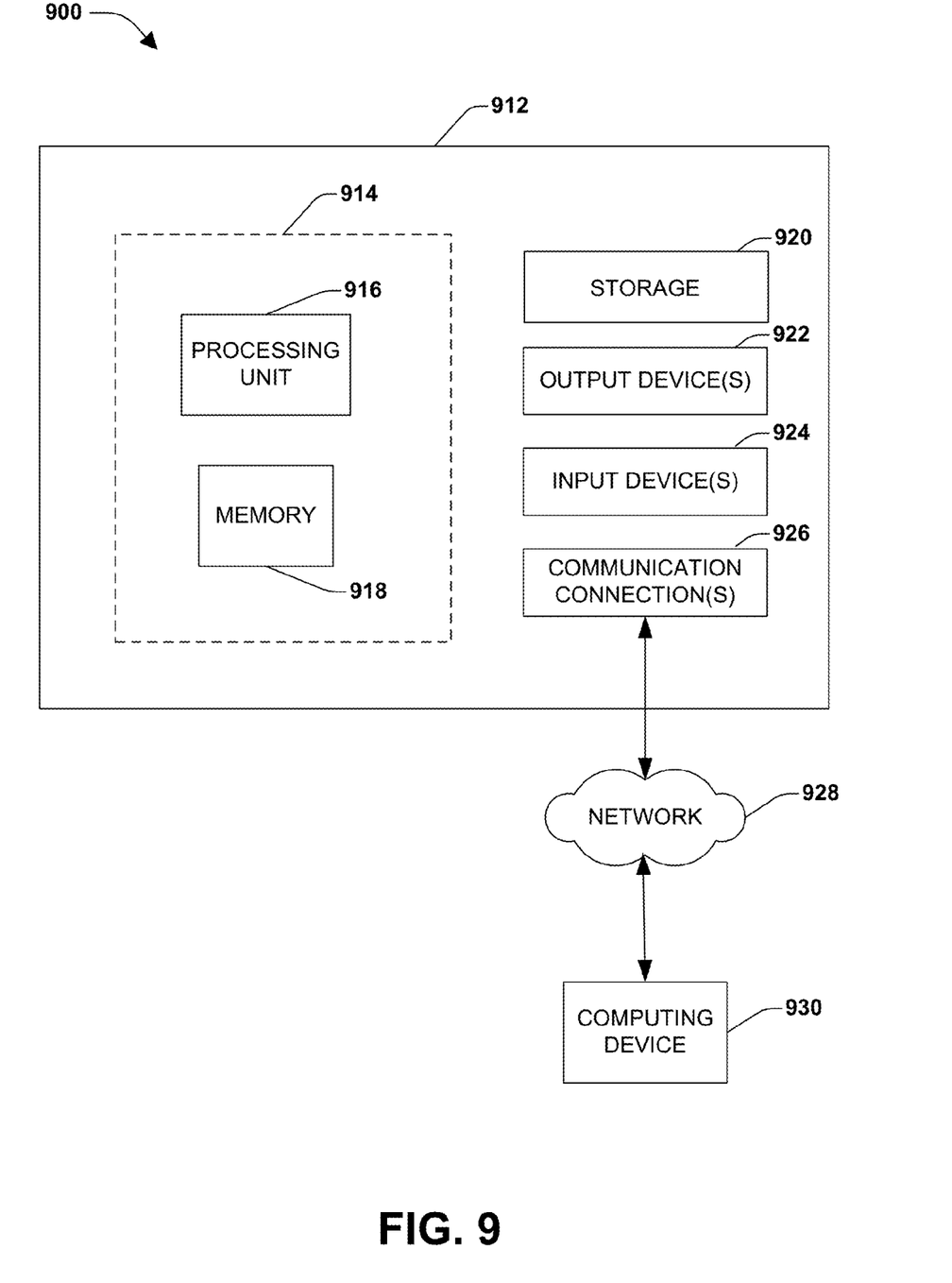
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented method for generating a travel interface, the method comprising:
    evaluating a set of user signals associated with a user to identify a plurality of potential travel locations;
    clustering the potential travel locations to create a location cluster, the location cluster comprising two or more potential travel locations of the plurality of potential travel locations;
    identifying a travel destination based upon the location cluster; and
    providing a recommendation based upon the potential destination.

2. The computer-implemented method of claim 1, wherein the set of user signals includes at least search query history associated with the user.

3. The computer-implemented method of claim 2, wherein the search query history includes at least one of:
    a flight search query;
    a hotel search query;
    a location search query;
    an attraction search query;
    a business search query; or
    an event search query.

4. The computer-implemented method of claim 1, wherein the set of user signals includes at least one of:
    a message associated with the user;
    a phone number called by the user;
    a social network post;
    user browsing history;
    content marked by the user through a social network;
    a calendar entry; or
    user created data.

5. The computer-implemented method of claim 1, further comprising determining a future travel date for traveling to the travel destination.

6. The computer-implemented method of claim 1, wherein providing the recommendation includes displaying the recommendation through at least one of: an operating system welcome screen, an operating system user interface, a mobile app, a website, a search engine homepage, or a carousel interface, and wherein the recommendation includes at least one of:
    a photo, extracted from a social network, associated with the destination;
    an image associated with the destination;
    a news story associated with the destination;
    an event at the destination;
    an advertisement for a business associated with the destination;
    a website link to a web site;
    an app link to a mobile app;
    a social network link to a social network profile of an entity associated with the destination;
    an attraction at the destination; or
    travel task completion information.

7. The computer-implemented method of claim 1, wherein identifying a travel destination further comprises utilizing a classifier and a travel training dataset to assign an intent to travel score to a potential travel destination above a travel threshold.

8. The computer-implemented method of claim 1, wherein the potential travel locations include attractions within a city, and the travel destination is the city.

9. A system comprising:
    at least one processor;
    a memory storing instructions that are configured to, when executed by the at least one processor, perform the following actions:
        evaluating a set of user signals associated with a user to identify a plurality of potential travel locations;
        clustering the potential travel locations to create a location cluster, the location cluster comprising two or more potential travel locations of the plurality of potential travel locations;
        identifying a travel destination based upon the location cluster; and
        providing a recommendation based upon the potential destination.

10. The system of claim 9, wherein the set of user signals includes at least search query history associated with the user.

11. The system of claim 9, wherein the search query history includes at least one of:
    a flight search query;
    a hotel search query;
    a location search query;
    an attraction search query;
    a business search query; or
    an event search query.

12. The system of claim 9, wherein the recommendation includes at least three of:
- a photo, extracted from a social network, associated with the destination;
- an image associated with the destination;
- a news story associated with the destination;
- an event at the destination;
- an advertisement for a business associated with the destination;
- a website link to a web site;
- an app link to a mobile app;
- a social network link to a social network profile of an entity associated with the destination;
- an attraction at the destination; or
- travel task completion information.

13. The system of claim 9, wherein the plurality of travel locations includes at least three travel locations.

14. The system of claim 9, wherein the user signals include a social network post and the recommendation includes a social media photo.

15. A device storing instructions that when executed perform a method comprising:
- displaying a travel interface having a plurality of sections;
- evaluating search query history of a user to identify a plurality of potential travel locations, wherein the potential travel locations include at least one of a hotel, an attraction, a business, or an event;
- clustering the potential travel locations to create a location cluster, the location cluster comprising two or more potential travel locations of the plurality of potential travel locations;
- identifying a travel destination based upon the location cluster; and
- populating the plurality of sections of the travel interface with recommendations based on the identified travel destination.

16. The device of claim 15, wherein the recommendations include at least two of:
- a photo, extracted from a social network, associated with the destination;
- an image associated with the destination;
- a news story associated with the destination;
- an event at the destination;
- an advertisement for a business associated with the destination;
- a website link to a web site;
- an app link to a mobile app;
- a social network link to a social network profile of an entity associated with the destination;
- an attraction at the destination; or
- travel task completion information.

17. The device of claim 15, wherein the potential travel locations are within a city, and the travel destination is the city.

18. The device of claim 15, wherein identifying a travel destination further comprises utilizing a classifier and a travel training dataset to assign an intent to travel score to a potential travel destination above a travel threshold.

19. The device of claim 15, wherein the travel interface includes at least one of:
- weather information for the destination;
- an attraction interface for the destination, the attraction interface comprising at least one of an attraction name, an attraction description, or an attraction image;
- a travel accommodation interface for the destination, the travel accommodation interface comprising at least one of a travel accommodation name, a travel accommodation description, or a travel accommodation image;
- a selectable interest interface associated with an interest;
- a travel date input interface; or
- a travel route planning interface.

20. The device of claim 15, wherein identifying a travel destination is further based on locational information associated with a device of the user.

* * * * *